United States Patent [19]
Loya

[11] Patent Number: 5,559,320
[45] Date of Patent: Sep. 24, 1996

[54] MOUNTING AND BALANCING SYSTEM FOR ROTATING POLYGON MIRROR IN A BAR CODE SCANNER

[75] Inventor: Richard R. Loya, Seattle, Wash.

[73] Assignee: Microscan Systems Incorporated, Renton, Wash.

[21] Appl. No.: 444,851

[22] Filed: May 19, 1995

[51] Int. Cl.$^6$ .................................................. G06K 7/10
[52] U.S. Cl. ............................................ 235/467; 359/198
[58] Field of Search ................................. 235/467, 462; 359/196, 197, 198, 200

[56] References Cited

U.S. PATENT DOCUMENTS

| | | | |
|---|---|---|---|
| 3,750,189 | 7/1973 | Fleischer | 346/76 |
| 4,953,925 | 5/1990 | Parker | 359/200 |
| 5,293,266 | 3/1994 | Kohsaka et al. | 359/198 X |

FOREIGN PATENT DOCUMENTS

| | | |
|---|---|---|
| 5-134201 | 5/1993 | Japan . |
| 6-102464 | 4/1994 | Japan . |

*Primary Examiner*—Donald T. Hajec
*Assistant Examiner*—Michael G. Lee
*Attorney, Agent, or Firm*—Graybeal Jackson Haley & Johnson

[57] ABSTRACT

Apparatus and method for detachably mounting and balancing a polygon mirror body onto a rotating motor hub to reflect a scanning beam of light used in reading bar codes. A bowed retaining ring engages a grooved stub structure that protrudes through a center aperture of a closed end of a cylindrical mirror support body such that the retaining ring can be removed and the polygon mirror body repositioned by rotation relative to the motor for optimal center of mass balance relative to the motor rotation, and reset the mirror body by the retaining ring at such optional balanced position.

9 Claims, 4 Drawing Sheets

MOUNTING AND BALANCING SYSTEM FOR ROTATING POLYGON MIRROR IN A BAR CODE SCANNER

BACKGROUND

The present invention relates to laser bar code scanners using rotating polygon mirrors and more particularly to a method and apparatus for fastening a polygon mirror onto a motor that results in assembly which can be easily balanced by mass and geometric centering without special tools or secondary operations.

Laser bar code scanners, as known in the art, employ a finely focused light beam repetitively scanned across the bar code rotating a polygon mirror that deflects the source laser beam. A photodetector responds to laser light reflections of the scanned bar code. The label represents information encoded as a series of various widths formed on a contrasting background. Difference in reflectance of the bars compared to the spaces produces a modulated optical signal. The optical signal is then converted to an electrical signal by the photodetector and that signal is further processed and then decoded.

Combined irregularities of the polygon mirror geometry and drive motor rotation can produce undesirable errors in the location of the resulting scans, especially those at right angles to the location of the intended scan line. These errors are known in the field as "tracking errors" and they become particularly important and limiting when the bar code reader is pushed to operate at high rates and at exceptional scan accuracy. There are four major sources of tracking errors that may be contributed to a scanning system by a mirror/motor assembly:

1. Errors in the angular location of polygon mirror facets that are molded on or positioned about the circumference of a cylindrical support body with respect to the datum surface of the polygon body.
2. Errors in the fastening of the polygon mirror body to the motor shaft.
3. Errors in the rotation of the motor shaft attributable to bearings, lack of rotor stiffness, thermal gradients causing rotor warp, and dynamic imbalance.
4. Errors in flatness within each mirror facet.

To compensate for these errors, efforts have focused on expensive components fabricated with very tight tolerances and/or time consuming balancing operations. This invention shows that the dominate errors, which are usually associated with source nos. 2 and 3 above, may be addressed more economically by using the unique, yet low cost hardware and method described herein below, which has proved to result in minimum tracking errors with relatively inexpensive, easily assembled low tolerance component mirror units and motors.

Some of these problems discussed above have been addressed in the prior art. Prior methods for correcting tracking errors fall into two basic categories, active and passive. Active systems involve auxiliary small-angle deflectors located in the optical system to compensate for motor/polygon-induced errors in tracking. Passive correction schemes usually utilize additional optical elements to reduce polygon-induced tracking errors.

For example, U.S. Pat. 3,750,189, Fleischer, discloses the use of cylindrical lenses in the scanning optical imaging system. These cylindrical lenses cause focusing in one direction of the parallel rays of light directed toward the polygon scan mirror. This focusing in one direction creates a line image on the facet running in the scan direction. The reflected rays from the polygon mirror are recollimated by a second cylindrical lens. The result of the one dimensional imaging is to permit scanning in one direction, namely the direction of rotation of the polygon, but it prevents scanning in the direction at right angles to it.

Another passive approach involves the use of a retroreflecting prism which first accepts the first scan beam from a polygon facet and returns those rays to the same facet. The second reflection will have an identical error but with the reverse sign of the rays reflected in the first bounce. The result is a cancellation of the facet error.

These prior techniques have added complexities and costs, and exhibit operating and/or servicing deficiencies in the overall performance of the scanner.

Thus it is an aspect of the invention to provide a systematic method for assembly and error compensation of polygon motor assemblies, and to provide a unique yet inexpensive set of mounting components and readily available fasteners to carry out the method.

It is a further aspect of the invention to provide a mounting scheme and balancing technique by which a scan line with a minimum tracking error is achieved without utilizing additional active or passive optical compensating systems, or time consuming secondary balancing operations.

SUMMARY OF INVENTION

The present invention achieves these objectives by providing a systematic method and structure for rapid assembly and error compensation of polygon mirror drive motor assemblies, utilizing inexpensive components and readily available fasteners. The mounting of the polygon mirror onto a motor results in assembly which can be easily balanced by mass centering without special tools or secondary operations and can be removed quickly for servicing or if subsequently needed, rebalancing.

Thus according to the preferred embodiment, a polygonal scanning mirror of a bar code reader having a plurality of reflective facets or faces arranged about the outer circumference of a substantially hollow cylindrical support body is mounted on a bell structure of an electrical motor by a connective member and a cooperating adjustable spring fastening ring that causes a static thrust holding the mirror body against the motor bell at a preset angle of optimum mass and geometric balance.

In the preferred embodiment, the polygonal scanning mirror support body has an inner cylindrical wall portion coaxial with the outer circumference and which is sized to slide over in a noninterference fit onto a cylindrical outer surface of the bell. An annular connective structure, of generally hat-shaped configuration is bonded onto a closed end hub at the top surface of the bell coaxial therewith and projects axially away from the bell hub to provide an attachment stud. A concentric aperture in an end wall structure of the cylindrical mirror support body receives the attachment stud and hence nominally centers the mirror on the motor bell hub. The adjusting fastener is preferably a removable bowed, split ring that as a spring clip engages a circumferential groove provided on the stud and removably locks the cylindrical support body in fixed friction engagement with the annular connective hat structure at a preset angular orientation. Removal of the bowed, split ring allows relative angle adjustment of the mirror support body to the connective structure and bell hub to balance out mass and geometric eccentricities of the polygonal scanning mirror and with respect to a center of rotation of the motor shaft.

Still another preferred feature is the alignment of the mirror support body with three spaced alignment standoffs projecting toward the connective structure from an interior surface of the apertured wall. The tips of these alignment standoffs contact the connective structure to align the apertured wall structure and hence support body to the underlying motor bell.

In its preferred form, the retaining split ring has a bowed configuration and a spring temper capable of maintaining a relatively high static thrust load that exerts a compressive force upon the mirror support body against the connective hat structure. The dimensions of the components are preselected such that the compressive holding force of the retaining ring fastens the polygon securely in a selected angular orientation to the motor bell but without distortion and allows removal for repositioning or servicing of the mirror body.

The present invention thus simplifies and facilitates balance error compensation through the ability of the bowed retaining ring to be removed and the polygon mirror repositioned to determine the optimal position of the polygon relative to the motor. The optimal position of the polygon is determined by observation of tracking error of the scan line. The optimal position is that position where there is minimum imbalance, where the center of mass and geometry of the polygon is most coincident with the axis of rotation of the motor, resulting in minimum tracking error of the scan line.

These simple yet significant cooperating elements compose an effective fastening method that is cost effective to produce and alleviates the need for relatively more expensive components, additional optical conditioning schemes, or complex balancing procedures.

DETAILED DESCRIPTION

Figure 1:
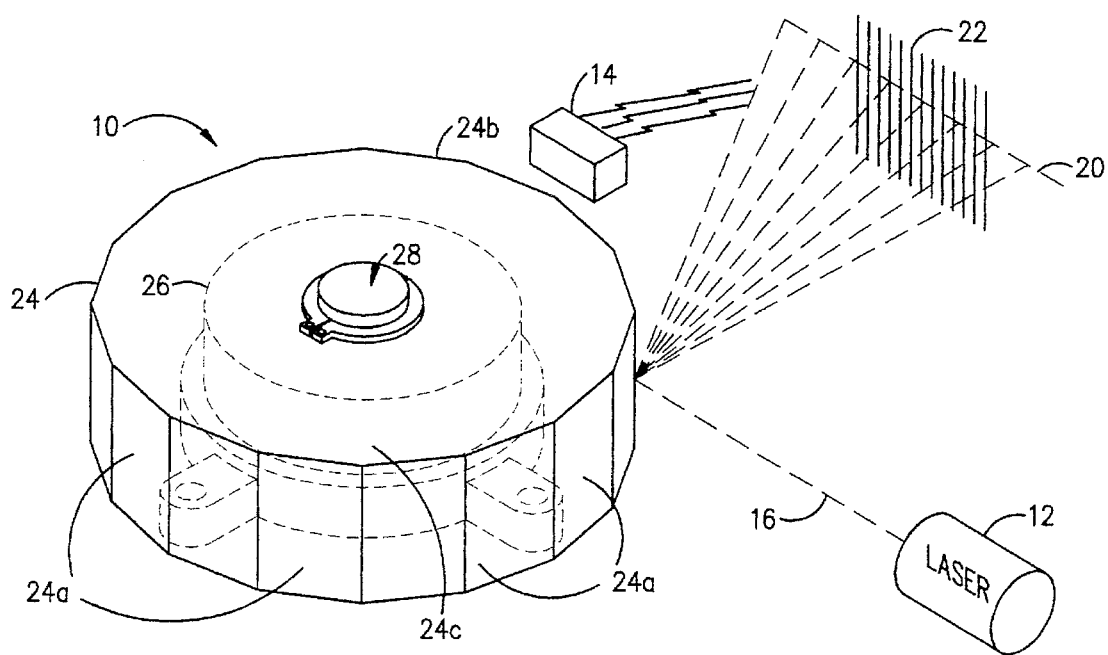
FIG. 1 is an isometric view of the polygon/motor system directing a laser scan line at an encoded label.
Figure 2:
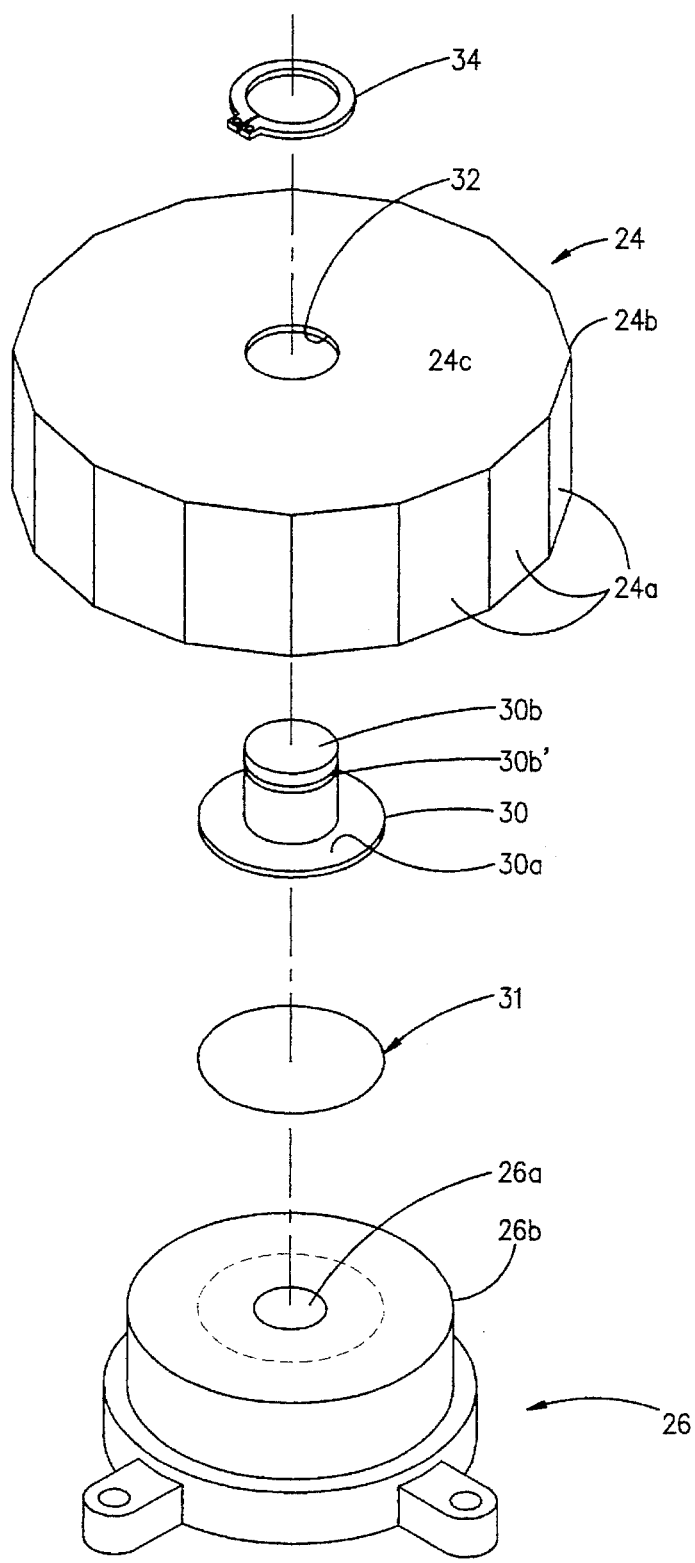
FIG. 2 is an exploded detail view of the components of the fastening system.

FIG. 1 shows the polygon scanning mirror and motor assembly 10 for coacting with a laser beam source 12, and detector 14 for reflecting laser beam 16 to project a scan line 20 onto a bar code 22. Polygonal scanning mirror 24 has reflective faces 24a on a generally hollow cylindrical shell or body 24b. In this example there are fourteen faces 24a uniformly disposed about the outer circumference of the shell in planes parallel to the axis of rotation. Support body 24b is open at one axial end (shown here at the bottom) and mostly enclosed at the other (top) axial end by an apertured wall structure 24c. An electrical motor 26 has a motor shaft (see top end of shaft 26a in FIG. 3) and a bell 26b coaxially fixed on the shaft 26a for receiving and rotating the scanning mirror 24 about its axis. Motor bell 26b has a cylindrical outer surface 26b' and a closed upper end surface 26b'' forming a hub at the protruding end of the motor shaft 26a. Bell 26b nests inside the open end of cylindrical support body 24b.

Adjustable fastening structure 28 at apertured wall 24c fastens cylindrical support body 24b to the closed or upper end of the bell 26b at its hub 26b''. For this purpose, polygonal scanning mirror support body 24b has an inner cylindrical wall portion 24d depending from apertured wall 24c and is coaxial with the outer circumference on which mirror faces 24a are arranged. Wall position 24d is shaped and sized to slide freely over the cylindrical outer surface 26b' of bell 26b. Adjustable fastening structure 28 includes an annular connective structure 30 of generally hat shaped configuration, with a lower flanged portion 30a bonded adhesively on the closed end hub surface 26b'' of the bell 26b coaxial therewith. Structure 28 has an axially and here upwardly projecting attachment stud 30b. Bonding is facilitated by a circular foam pad 31 placed between structure 30 and hub surface 26b''. A concentric aperture 32 in wall structure 24c of cylindrical support body 24b fits freely over attachment stud 30b. The adjusting fastening structure 28 further includes a removable bowed, split ring 34 having a spring temper that snaps into a groove 30b' of stud 30b removably locking said cylindrical mirror support body in fixed friction engagement with the annular connective structure 30. Removal of the bowed, split ring 34 affords the described adjustment orientation of the relative angle of cylindrical mirror support body 24b to connective structure 30 and hence hub 26b to balance out mass and geometric eccentricities with respect to a center of rotation of the shaft 26a of motor 26.

Cylindrical support body 24 has a plurality of three (3) equally spaced alignment standoffs 24e (see FIGS. 3 and 4) projecting toward said connective structure 30 (when the system is assembled) from the interior of apertured wall structure 24c. Standoffs 24e contact the closed end hub surface 26b'' of the motor bell 26 to align the apertured wall structure 24c of said cylindrical support body 24b and hold it parallel with the closed end of bell 26b''.

Figure 3:
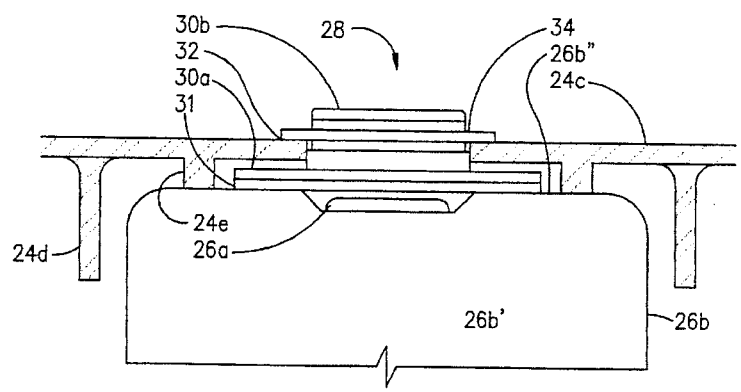
FIG. 3 as a sectional side view of assembled components with the outer portions the mirror body cut away.
Figure 4:
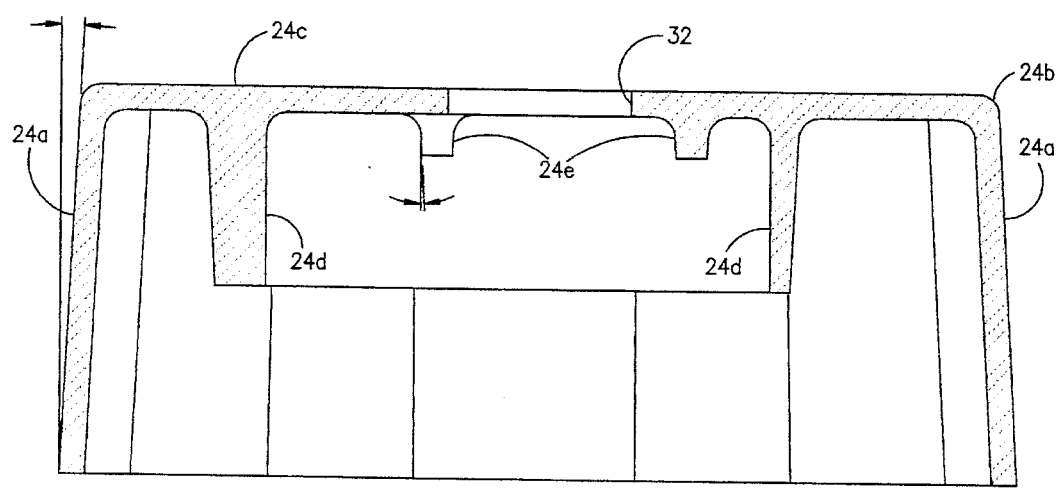
FIG. 4 is a sectional side view similar to FIG. 3, showing the full diameter of the mirror body.

As shown in FIGS. 3 and 4, the alignment standoffs 24e are preferably an array of three (3) spaced integral projections arrayed in a circle and molded on interior surface of apertured wall structure 24c and having tips terminating within 1/1000 inches in a reference plane. The close tolerance tips or extents of these standoffs engage the closed end hub surface 26b'' of the motor bell 26b under static spring thrust force of bowed, split ring 34 acting on the upper exterior surface of apertured wall structure 24c.

Cylindrical mirror support body 24 is preferably a molded polymer shell having a reflective coating on the plurality of molded reflective planar mirror surfaces or faces 24a. cylindrical axis.

Figure 5:
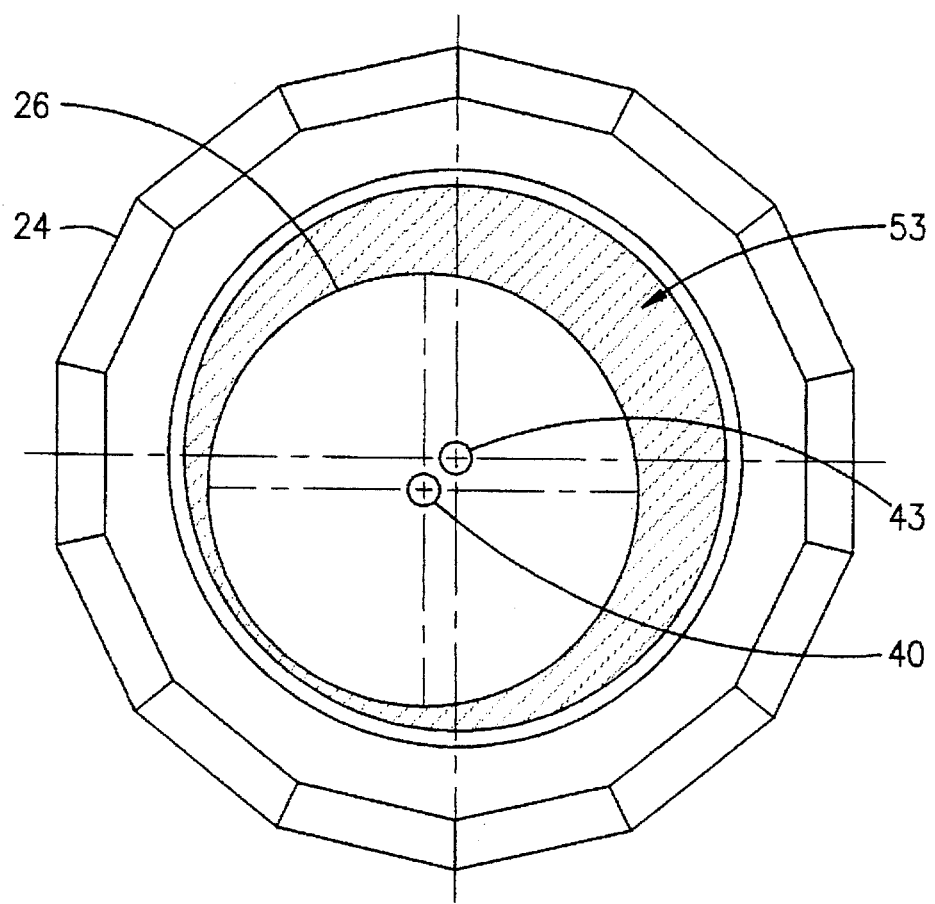
FIG. 5 is a schematic top view of the assembly to aid in explaining the balancing method.

FIG. 5 depicts the relative position of the axis of rotation 40 of motor 26 with regard to the center of mass 43 of the polygon body 24b. The cross hatched area 53 represents the clearance between the outside diameter of the motor bell 26b and the inside diameter of the polygon mirror support body 24b mounting surface. This depiction exaggerates the clearance for illustration. The attachment method embodied herein allows for repositioning of the angular orientation of mirror 24 and hence its center of mass 43 in a plane transverse to the axis of rotation 40. The position of the polygon body 24b relative to the motor is optimum when the center of mass of the polygon body is co-incident with the axis of rotation 40 of the motor. The adjustment minimizes any out-of-balance condition which may have existed.

It is the ability of this attachment method to compensate for assembly clearances that is a key advantage of the system. Having the ability to compensate for assembly clearances allows a design with larger assembly clearances and thus relatively large component tolerances. The larger assembly clearances enable the utilization of a clearance fit between the motor and the polygon mirror. The clearance fit imparts no stress on the molded polymer polygon body that might induce physical distortion and result in a source of error in the scan line. The ability to utilize larger component tolerances also results in reduced manufacturing costs.

While only particular embodiments have been disclosed herein, it will be readily apparent to persons skilled in the art that numerous changes and modifications can be made thereto, including the use of equivalent means, devices, and method steps without departing from the spirit of the invention.

I claim:

1. In a barcode scanner, a polygonal scanning mirror having a plurality of reflective faces arranged about the outer circumference of a substantially hollow cylindrical support body open at one axial end and partly enclosed at the other axial end by an apertured wall structure; an electrical motor having a motor shaft for rotating the scanning mirror about the principal axis of said cylindrical support body; a cylindrical motor hub fixed coaxially on said motor shaft and having a cylindrical outer surface and a closed end surface for nesting inside the open end of said cylindrical support body; and adjustable fastening means disposed at said apertured wall structure for fastening said cylindrical support body to said closed end surface of said hub so as to adjustably balance mass and geometric eccentricities thereof.

2. In the barcode scanner of claim 1, said polygonal scanning mirror support body comprising an inner cylindrical wall portion coaxial with said outer circumference and sized to slide in close tolerance onto said cylindrical outer surface of said hub; and further comprising an annular connective structure on the closed end surface of said hub coaxial therewith and having an axially projecting attachment stud; a concentric aperture in the wall structure of said cylindrical support body through which said attachment stud projects; and said adjustable fastening means comprising a removable spring clip means for engaging said stud and removably locking said cylindrical support body in fixed friction engagement with said annular connective structure so that removal of said spring clip means affords relative adjustment rotation of said cylindrical support body to said connective structure and hub to balance out mass and geometric eccentricities of the polygonal scanning mirror and hub and with respect to a center of rotation of said motor shaft.

3. In the barcode scanner of claim 2, said annular connective structure comprises a separate member that is fastened to said hub surface.

4. In the barcode scanner of claim 2, said cylindrical support body having a plurality of alignment standoffs projecting toward said connective structure from said apertured wall structure that contact said connective structure to align said apertured wall structure of said cylindrical support body and hold it parallel with the closed end surface of said hub.

5. In the barcode scanner of claim 4, said plurality of alignment standoffs comprising an array of three circumferentially spaced integral projections on an interior surface of said apertured wall structure that engage said cylindrical motor hub under a spring bias force of said spring clip means acting on the opposed exterior surface of said apertured wall structure of said cylindrical support body.

6. In the barcode scanner of claim 4, said annular connective structure is a hat-shaped member in which the brim portion of the hat shape is adhered to said closed end surface of said hub and a central portion of the hat shape projects as said stud up through an aperture in said apertured wall structure.

7. In the barcode scanner of claim 2, said spring clip means comprising a split ring clip having a bowed configuration to provide said spring bias for pushing said cylindrical mirror support body down against said connective structure and hub.

8. In the barcode scanner of claim 1, wherein said cylindrical mirror support body comprises a molded polymer shell having a reflective coating on a plurality of molded reflective planar mirror surfaces facing radially outwardly from the cylindrical axis.

9. In the barcode scanner of claim 1, further comprising a source of coherent scanning light adapted to be directed toward rotating reflective faces of said cylindrical mirror support body to cause the light to be reflected and scanned by the rotation of said polygonal mirror across a distal barcode target, whereby reflections from said target are detected and decoded.

* * * * *